United States Patent
Kawanishi et al.

(10) Patent No.: US 9,503,186 B2
(45) Date of Patent: Nov. 22, 2016

(54) SPACE DIVISION MULTIPLEXING APPARATUS INCLUDING MULTI-CORE FIBER AND SELFHOMODYNE DETECTION METHOD

(71) Applicant: National Institute of Information and Communications Technology, Nukui-Kitamachi, Koganei-shi, Tokyo (JP)

(72) Inventors: Tetsuya Kawanishi, Koganei (JP); Yoshinari Awaji, Koganei (JP); Ben Puttnam, Koganei (JP); Atsushi Kanno, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 3 days.

(21) Appl. No.: 14/424,031

(22) PCT Filed: Mar. 22, 2013

(86) PCT No.: PCT/JP2013/058341
§ 371 (c)(1),
(2) Date: Feb. 25, 2015

(87) PCT Pub. No.: WO2014/034165
PCT Pub. Date: Jun. 3, 2014

(65) Prior Publication Data
US 2015/0222356 A1    Aug. 6, 2015

(30) Foreign Application Priority Data

Aug. 30, 2012 (JP) ................................. 2012-189563
Sep. 14, 2012 (JP) ................................. 2012-202247

(51) Int. Cl.
| | |
|---|---|
| H04B 10/25 | (2013.01) |
| H04J 14/04 | (2006.01) |
| H04B 10/61 | (2013.01) |
| G02B 6/02 | (2006.01) |
| G02B 6/04 | (2006.01) |
| H04B 10/63 | (2013.01) |
| H04J 14/00 | (2006.01) |
| H04J 14/06 | (2006.01) |

(52) U.S. Cl.
CPC ............ *H04B 10/2504* (2013.01); *G02B 6/02* (2013.01); *G02B 6/04* (2013.01); *H04B 10/61* (2013.01); *H04B 10/63* (2013.01); *H04J 14/00* (2013.01); *H04J 14/04* (2013.01); *H04J 14/06* (2013.01); *G02B 6/02042* (2013.01)

(58) Field of Classification Search
None
See application file for complete search history.

(56) References Cited

FOREIGN PATENT DOCUMENTS

| | | |
|---|---|---|
| JP | 2005-006017 A | 1/2005 |
| JP | 2007-074273 A | 3/2007 |
| JP | 2008-244529 A | 10/2008 |

OTHER PUBLICATIONS

International Search Report of international patent application No. PCT/JP2013/058341completed on Apr. 9, 2013 and mailed Apr. 16, 2013 (4 pages).
Sakaguchi et al, 19-core fiber transmission of 19x100x172-Gb/s SDM-WDM-PDM-QPSK signals at 305Tb/s, Optical Fiber Communication Conference and Exposition (OFC/NFOEC), 2012 and the National Fiber Optic Engineers Conference PDP5C.1, Mar. 4, 2012, p. 1-3.
Kamio et al, 80-Gb/s 256-QAM Signals using Phase Noise and DGD-Tolerant Pilot-Carrier-Aided Homodyne Detection, Optical Communication (ECOC), 2007 33rd European Conference and Exhibition, Sep. 16, 2007, p. 1-2.

*Primary Examiner* — Darren E Wolf
(74) *Attorney, Agent, or Firm* — Pyprus Pte Ltd (57) ABSTRACT

To provide a self-homodyne detection communication system capable of using a space-division multiplexing signal as a signal for communication. The present invention relates to a space-division multiplexing apparatus 12 including a multi-core fiber 11 having multiple cores. The space-division multiplexing apparatus 12 uses cores other than a core 13 for self-homodyne detection among the multiple cores included in the multi-core fiber 11 as cores 16 for communication. The space-division multiplexing apparatus is configured to include a pilot-tone guiding unit 14 and a self-homodyne detection unit 15.

5 Claims, 4 Drawing Sheets

SPACE DIVISION MULTIPLEXING APPARATUS INCLUDING MULTI-CORE FIBER AND SELFHOMODYNE DETECTION METHOD

TECHNICAL FIELD

The present invention relates to a space-division multiplexing (SDM) apparatus and a method for self-homodyne coherent detection by using a multi-core fiber. The present invention uses one core of the multi-core fiber for transmission of an optical signal for homodyne detection.

BACKGROUND ART

JP 2007-74273 A discloses a coherent optical transmission method capable of transmitting multi-level signals. The method simultaneously transmits two signals having correlation through independent channels and offsets phase fluctuations of light sources. A reference code is transmitted by the one of optical carrier waves, and a multi-level signal where a to-be-transmitted data signal is superimposed on the reference code is transmitted by the other of the optical carrier waves. In addition, optical heterodyne detection or optical self-homodyne detection is performed by using two optical carrier waves included in a received optical signal, so that coherent optical transmission is performed.

JP 2005-6017 A discloses an optical wireless communication system which space-division multiplexes optical signals and transmits the multiplexed signal between a transmission apparatus and a reception apparatus.

CITATION LIST

Patent Literature

Patent Literature 1: JP 2007-74273 A
Patent Literature 2: JP 2005-6017 A

SUMMARY OF INVENTION

Technical Problem

The present invention is to enable self-homodyne detection in an optical communication system utilizing a space-division multiplexed system for optical communication.

The present invention is to provide a self-homodyne detection technique having good efficiency by using an inexpensive light source and, to reduce transmission capacity which is lost in local oscillator transmission, and to improve reception characteristics.

Solution to Problem

The present invention is essentially based on the findings of capable of providing a self-homodyne detection technique suitable for a space-division multiplexing (SDM) apparatus by using one core of a multi-core fiber for transmission of pilot tones.

At least one of the above-described objects is solved by the following inventions.

A first aspect of the present invention relates to a space-division multiplexing apparatus 12 including a multi-core fiber 11 having multiple cores. The space-division multiplexing apparatus 12 uses a specific core 13 for transmission of a pilot tone for self-homodyne detection of data signals in the remaining cores 16 of the multi-core fiber 11. The space-division multiplexing apparatus is configured to include a pilot-tone guiding unit 14 and a self-homodyne detection unit 15.

An example of the multi-core fiber 11 is a core configured to include a center core and a plurality of cores existing around the center core. In this case, for example, the center core may be used as the specific core 13 for pilot-tone transmission to enable self-homodyne detection.

A diameter $\phi_s$ of the core 13 for self-homodyne detection and a diameter $\phi_c$ of the cores 16 for optical data signals may have a relationship of $0.5 \leq \phi_s/\phi_c \leq 3$.

The pilot-tone guiding unit 14 is a component for guiding the pilot tone for self-homodyne detection to the core 13 for self-homodyne detection which is any one of the multiple cores.

The self-homodyne detection unit 15 is a component for detecting the pilot tone output from the core 13 for self-homodyne detection and performing the self-homodyne detection.

In the above-described preferred aspect, the space-division multiplexing apparatus further includes a multiplexing unit 21 and a signal guiding unit 17. The multiplexing unit 21 is a component for multiplexing the signals for communication and the pilot tone. The signal guiding unit 17 is a component for guiding the optical data signals multiplexed by the multiplexing unit 21 into the cores 16 used for their transmission.

In the above-described preferred aspect, the space-division multiplexing apparatus further includes an optical frequency comb generator for generating any one or both of the pilot tone and the optical data signal for communication propagating through the cores 16 for optical communication. The optical frequency comb generator may be an optical frequency comb generator which generates multiple pilot tones. In addition, the optical frequency comb generator may be an optical frequency comb generator which generates both of the pilot tone and the data signal for optical communication. In addition, the optical frequency comb generator may be an optical frequency comb generator which generates multiple data signals for optical communication.

In the above-described preferred aspect, the space-division multiplexing apparatus further includes an optical path length adjustment unit for adjusting an optical path length difference of each core in the multi-core fiber 11 having the multiple cores.

A second aspect of the present invention relates to a self-homodyne detection method using a space-division multiplexing apparatus 12 including a multi-core fiber 11 having multiple cores. An example of the space-division multiplexing apparatus 12 is one of the space-division multiplexing apparatuses 12 described above.

In the method, first, a pilot tone for self-homodyne detection is guided to a core 13 for transmission and self-homodyne detection of any one of the multiple cores. In the method, next, the pilot tone output from the core 13 for self-homodyne detection is received, and the self-homodyne detection is performed.

Advantageous Effects of Invention

According to the present invention, homodyne reception is performed by using a pilot tone transmitted from a transmitter together with data signal light, so that the present invention can be used for space-division multiplexing optical communication, and an optical reception system with a simple configuration can be realized. In addition, according to the present invention, coherent transmission using an inexpensive light source can be realized. In the case where the number of cores is large, this capacity reduction ratio becomes small. However, since the pilot tone is transmitted through the same multi-core fiber, almost the same disturbance as that of a signal light is received, so that it is expected to improve of reception characteristics.

DESCRIPTION OF EMBODIMENTS

Hereinafter, embodiments of the present invention will be described with reference to the drawings. The present invention is not limited to the embodiments described below, and well-known components can be appropriately employed.

A first aspect of the present invention relates to a space-division multiplexing apparatus 12 including a multi-core fiber 11 having multiple cores. The space-division multiplexing apparatus 12 uses cores other than a specific core 13 for self-homodyne detection among the cores included in the multi-core fiber 11 as cores 16 carrying optical data signals.

Figure 2:
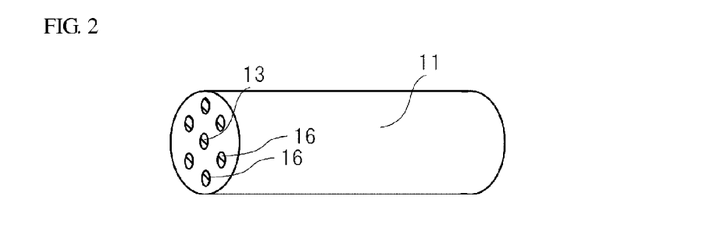
FIG. 2 is a conceptual diagram illustrating a multi-core fiber.
Figure 3:
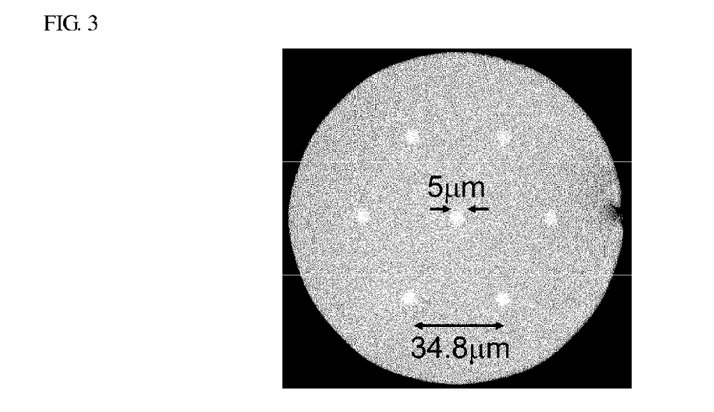
FIG. 3 is a picture as a substitute for a diagram, illustrating an example of a cross-sectional diagram of a multi-core fiber.

FIG. 2 is a conceptual diagram illustrating the multi-core fiber. FIG. 3 is a picture as a substitute for a diagram, illustrating an example of a cross-sectional diagram of the multi-core fiber. The multi-core fiber 11 is an optical fiber having two or more cores. As an example of the multi-core fiber, there is a multi-core fiber having a center core and one or a plurality of cores existing around the center core or a rectangular core fiber having two or more rectangular cores. In the multi-core fiber 15, a core may not necessarily exist at the center. For example, a multi-core fiber where 2 to 4 (or more) cores are symmetrically arranged may be employed. Each core has a function as a waveguide in the multi-core fiber. Adjacent waveguides exist in a distance of, for example, 1 or more micrometers to 100 or less micrometers. The interval of the waveguides may be 3 or more micrometers to 70 or less micrometers, may be 5 or more micrometers to 70 or less micrometers, may be 10 or more micrometers to 60 micrometers, may be 20 or more micrometers to 50 micrometers, or may be 30 or more micrometers to 40 or less micrometers. The distance between the adjacent waveguides denotes a distance of a portion (for example, a clad portion) where no additional cores exist.

In the example of the multi-core fiber 11, the multi-core fiber includes the center core and the plurality of cores existing around the center core. In this case, for example, the center core may be used as a core 13 for self-homodyne detection. Moreover, in the case of considering convenience of manufacturing or the like or in the case of selectively using varied cores, the core 13 for self-homodyne detection may not be the center core of the multi-core fiber 11.

A diameter $\phi_s$ of the core 13 for self-homodyne detection and a diameter $\phi_c$ of the cores 16 for communication may have a relationship of $0.5 \leq \phi_s/\phi_c \leq 3$. A preferred example of the relationship between the diameter $\phi_s$ of the core 13 for self-homodyne detection and the diameter $\phi_c$ of the cores 16 for communication is $1.01 \leq \phi_s/\phi_c \leq 1.15$, may be $1.1 \leq \phi_s/\phi_c \leq 1.3$, may be $1.2 \leq \phi_s/\phi_c \leq 3$, and may be $2 \leq \phi_s/\phi_c \leq 3$. An optical frequency comb light beam including multiple optical spectra may be generated by using a reference light beam including one or multiple (for example, 2 or more to 10 or less, 2 or more to 6 or less, 3 or more to 6 or less, or 3 or more or 5 or less) optical spectra (frequency components) through non-linearity in the fiber. This optical frequency comb light beam may be used as a reference light beam for demodulating each channel of wavelength-division multiplexing (WDM) in the receiver side. Particularly, in the case where the present invention is used for this application, it is preferable that the core 13 for self-homodyne detection is smaller than the cores 16 for communication. In this case, in the preferred examples, the relationship between the diameter $\phi_s$ of the core 13 for self-homodyne detection and the diameter $\phi_c$ of the cores 16 for communication may be $0.7 \leq \phi_s/\phi_c \leq 0.99$, may be $0.7 \leq \phi_s/\phi_c \leq 0.95$, and may be $0.95 \leq \phi_s/\phi_c \leq 0.99$. The optimal core diameters may be designed in consideration of the conditions such as an input light beam, a fiber length, a dispersion characteristic of fiber, and the number of spectra required.

Figure 1:
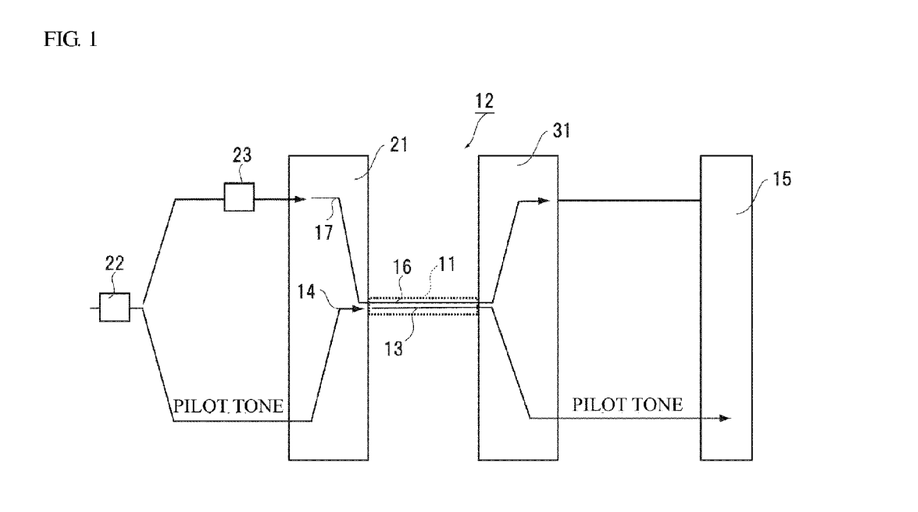
FIG. 1 is a block diagram illustrating a space-division multiplexing apparatus according to the present invention.

The light beam output from a light source 22 is appropriately demultiplexed. At least one of the demultiplexed light beams is used as a pilot tone (pilot signal), for example, for self-homodyne detection. The pilot tone or the pilot signal is a signal which is used as a reference of phase in the homodyne detection period. A well-known light source may be used as the light source 22. As an example of the light source 22, there is a light source including an optical frequency comb generator. By using the optical frequency comb generator, it is possible to easily generate a multiple-wavelength signal. The pilot tone may be appropriately delayed by a delay unit (for example, a delay circuit).

An optical signal for communication may be appropriately modulated by a modulator 23. As an example of the modulator 23, there is a phase modulator. A plurality of the signals for communication may be guided to the respective cores by a signal guiding unit 17. Each light beam generated by the light source 22 may be appropriately modulated.

As an example of a multiplexing unit 21, there is a space-division multiplexing unit (SDM MUX). The space-division multiplexed optical signal 11 denotes an optical signal when multiple paths or multiple types of optical signals exist in a space which becomes a transmission line. Examples of the space-division multiplexed optical communication are disclosed in JP 10-336152 A and JP 2009-284385 A.

An example of the space-division multiplexed optical signal 11 is any one of an optical signal in a Gaussian mode, an optical signal in a Laguerre-Gaussian mode, a Bessel beam optical signal, an optical signal in a Hermite-Gaussian mode, or an optical signal in an Airy mode. Components such as optical elements constituting a switching device may be appropriately adjusted. For example, in the case where the optical signal of the Gaussian mode is output from a mode converter 13, the optical signal is irradiated to a first waveguide 17. Then, for example, in the case where the optical signal of the Laguerre-Gaussian mode (the Bessel beam optical signal, the optical signal of the Hermite-Gaussian mode, or the optical signal of the Airy mode may be used) is output from the mode converter 13, the optical signal is irradiated to a second waveguide 18. The optical signal of the mode is disclosed in, for example, JP 4871326 and JP 2003-139514 A. Next, the mode of the space-division multiplexed optical signal is appropriately converted by mode conversion described later.

The optical signal of the Laguerre-Gaussian mode which is a space-division multiplexed optical signal is light of the mode with a ring shape intensity distribution which is concentric from the central axis of the beam propagation. In addition, the Gaussian mode is a mode having the maximum intensity in the central axis of the beam propagation. In the present invention, with respect to the optical signal of the Laguerre-Gaussian mode, a theoretical optical signal having a completely ring-shaped intensity distribution and an optical signal having a ring-shaped intensity distribution to the extent that may be determined to be the optical signal of the Laguerre-Gaussian mode are included in the optical signal of the Laguerre-Gaussian mode. This analysis is similarly applied to the other modes. The present invention may include a space-division multiplexed optical signal generation device for generating the space-division multiplexed optical signal and may be a device using the space-division multiplexed optical signal generated by the space-division multiplexed optical signal generation device. As an example of the space-division multiplexed optical signal device, a device including the Laguerre-Gaussian mode optical signal generation device for generating the optical signal of the Laguerre-Gaussian mode and a device including the Hermite-Gaussian mode optical signal generation device for generating the optical signal of the Hermite-Gaussian mode, may be employed.

The Bessel beam optical signal denotes a light beam having an electric field distribution of a Bessel function type in the radial axis. The Bessel beam optical signal propagates at a substantially constant beam diameter without causing diffraction. As an example of the space-division multiplexed optical signal device, a device including a Bessel beam optical signal generation device for generating the Bessel beam optical signal may be employed. The optical signal of the Airy mode is an optical signal of which intensity distribution is related to the Airy distribution. An apparatus for outputting an Airy-ring-shaped optical signal is well known.

In the multiplexing unit 21, a pilot tone for self-homodyne detection is guided to the core 13 for self-homodyne detection which is any one of the multiple cores. An optical system of the multiplexing unit 21 has a function as, for example, a pilot-tone guiding unit 14.

In the above-described preferred aspect, the space-division multiplexing apparatus is configured to further include a multiplexing unit 21 and a signal guiding unit 17. The multiplexing unit 21 is a component for multiplexing the data signals for communication and the pilot tone. The signal guiding unit 17 is a component for guiding the data signals for communication among the signals multiplexed by the multiplexing unit 21 to the cores 16 for communication. The optical system of the multiplexing unit 21 has a function as, for example, the signal guiding unit 17.

The signal propagating through the multi-core fiber 11 is separated, for example, by a separation unit 31. An example of the separation unit 31 is a space-division demultiplexing unit (SDM DE-MUX). In the separation unit 31, the pilot tone is guided to an optical path for the pilot tone. Next, the pilot tone reaches a self-homodyne detection unit 15. On the other hand, the data signal for communication is also separated by the separation unit 31. The data signal for communication is guided to the optical path for communication in the separation unit 31. Next, the data signal for communication reaches the self-homodyne detection unit 15.

The self-homodyne detection unit 15 is a component for detecting the pilot tone output from the core 13 for self-homodyne detection and performing the self-homodyne detection. Namely, the self-homodyne detection unit 15 demodulates the data signal for communication by using the pilot tone as a reference signal. The homodyne detection is a detection technique according to a phase modulation method, in which a signal is extracted by using interference when the frequency of the optical carrier wave and the frequency of a locally oscillating light beam are equal to each other. The self-homodyne detection technique using the pilot tone is well-known (for example, Institute of Electronics and Communication Engineers of Japan, Technical Report. CS, Communication Method 107 (91), 17-22, 2007 Jun. 8)).

It is preferable that the space-division multiplexing apparatus 12 according to the present invention accurately controls the optical path length of each core of the multi-core fiber (therefore, the optical path length difference between the cores). Therefore, the embodiment where a transmission-side apparatus or a receiver-side apparatus is configured to include an optical path length adjustment unit which adjusts the optical path length of each core of the multi-core fiber is a preferred embodiment of the present invention. The optical path length adjustment unit is installed, for example, in a connection device of the multi-core fiber and other optical components. As specific values of the optical path length difference, according to performance of a laser in use, the optical path length difference of each core is set to, for example, 10 meters or less, preferably, 1 meter or less, preferably, 30 centimeters or less, more preferably, 3 centimeters or less. The optical path length difference of each core denotes a difference between the longest optical path length and the shortest optical path length among the multiple cores. For example, the optical path adjustment unit may measure the optical path length difference of each core of the multi-core fiber in advance, and the optical path length adjustment unit may adjust the optical path length of each core in accordance with the performance of the laser. An example of the optical path length adjustment unit is an optical delay circuit or an optical fiber.

In order to realize stable operations, it is preferable that the space-division multiplexing apparatus 12 according to the present invention monitors the optical path length difference of each core and controls the optical path length of each core which is adjusted by the optical path length adjustment unit based on the obtained information on the optical path length difference. An automatic adjustment mechanism for the optical path length difference may include, for example, an optical path difference measurement unit which measures the optical path length difference of each core, a control unit which receives the optical path length difference of each core measured by the optical path length measurement unit, and an optical path length adjustment unit which adjusts the optical path length difference of each core in response to a command from the control unit.

A second aspect of the present invention relates to a self-homodyne detection method using a space-division multiplexing apparatus 12 including a multi-core fiber 11 having multiple cores. An example of the space-division multiplexing apparatus 12 is one of the space-division multiplexing apparatuses 12 described above.

In the method, a light beam from a light source 22 is demultiplexed. Next, a pilot tone for self-homodyne detection is guided to a core 13 for self-homodyne detection which is any one of the multiple cores. On the other hand, the demultiplexed light beams are multiplexed, and a modulation signal is carried on the light beams. The pilot tone and the multiplexed signal are introduced into the multi-core fiber. Next, the pilot tone and the space-division multiplexed signals are separated, and each signal is guided to the self-homodyne detection unit 15. The self-homodyne detection unit 15 detects the pilot tone output from the core 13 for self-homodyne detection and performs the self-homodyne detection by using the pilot tone as a reference signal. In this example, the receiver side or the transmitter side generates an optical frequency comb light beam from the reference light beam for self-homodyne detection. Next, each optical frequency comb signal is used as the reference light beam for demodulating each channel of WDM signal. Since an optical frequency comb signal generation device is already known, a well-known optical frequency comb signal generation device may be used in order to obtain the optical frequency comb light beam using the reference light beam. An example of the optical frequency comb signal generation device is disclosed in JP 3937233, JP 4423372, JP 4771216, JP 3444958, or JP 2011-221366 A. An example of the optical frequency comb generator is an optical frequency comb generator configured to include an optical fiber loop. The optical fiber loop is configured to include an optical single-sideband (SSB) modulator, an optical input port through which the light from the light source is input, and an optical output port which outputs the light. In the optical frequency comb signal, each frequency is shifted. Therefore, each optical frequency comb signal can be used as the reference light beam for demodulating the channel of the corresponding WDM.

[First Embodiment]
Description of Experiment

Figure 4:
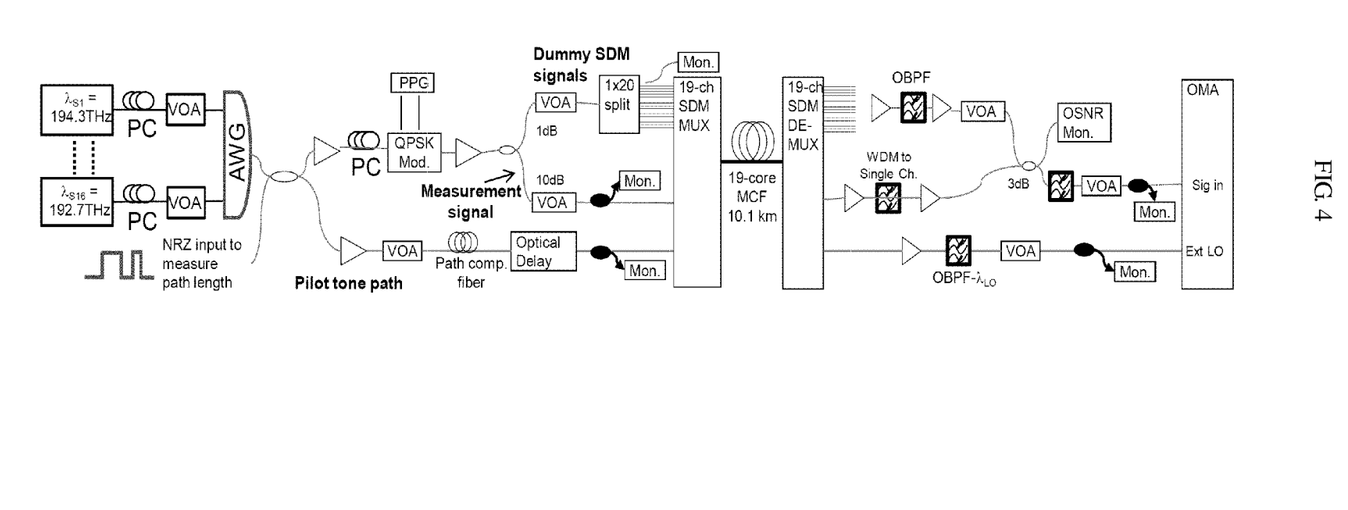
FIG. 4 is a conceptual diagram illustrating an experimental system of a first embodiment.

FIG. 4 is a conceptual diagram illustrating an experimental system according to a first embodiment. In FIG. 4, PC denotes a polarization regulator, VOA denotes a variable optical attenuator, AWG denotes an array waveguide grating, NRZ denotes a nonreturn-to-zero signal, PPG denotes a pulse pattern generator, QPSK denotes four-level phase shift keying, Mod. denotes a modulator, SDM denotes space-division multiplexing, Optical Delay denotes an optical delay circuit, 19-ch denotes 19 channel, OBPF denotes an optical band-pass filter, Mon. denotes a monitor, OSNR denotes an optical S/N ratio, and OMA denotes an optical modulation analyzer.

An external cavity tunable laser (ECTL) at 193.5 THz was used for measurement signals. In WDM operation, carriers from the ECTL and 15 distributed feedback (DFB) lasers on a 100-GHz grid were multiplexed together in a temperature controlled arrayed-waveguide-grating (AWG) at the input to a 3-dB coupler used to split carriers for data modulation from those to be transmitted as the pilot-tone. The ECTL linewidth was estimated to be within 500 kHz~1 MHz. The additional input port of the coupler was used for an intensity-modulated signal used to align the total optical path lengths traversed by the measurement signal and pilot tone periodically between bit error rate (BER) measurements. The signal path was then amplified in an Erbium-doped fiber amplifier (EDFA) and its polarization adjusted at the input to a QPSK modulator driven by two decorrelated $2^{15}-1$-bit pseudo-random bit stream (PRBS) signals for I and Q at 5 Gbaud. The high power arm of the 10 dB coupler was then used at the input of a 1×20 splitter used to split the signal between 17 of the input fibers of the SDM MUX and subsequently in to 17 different cores of the multi-core fiber. These acted as dummy data channels and the remaining 3 ports of the splitter were used for power and spectrum monitoring. The low power output of the coupler was connected directly to the SDM MUX input of an outer core used to transmit the decorrelated signal channel upon which BER measurements were made. VOAs were used on both coupler outputs to control the fiber launch power of both the dummy SDM channels and the signal channel. The pilot tone was then connected to the remaining multi-core fiber cores via the SDM MUX with 3 different cores selected during the measurements. The pilot-tone path also contained an EDFA, VOA and some additional fiber and optical delay used to align the optical path lengths.

After transmission across the 19 core multi-core fiber, the SDM-DEMUX was used to separate the pilot-tone and measurement signal channel in to separate fibers for reception and the dummy SDM channels were terminated. The measurement signal was then amplified and filtered by a 1 nm OBPF to select the wavelength for reception. After a further EDFA, the signal was combined with the output of an amplified spontaneous emission (ASE) source constructed from 2 EDFAs either side of a 1.2 nm OBPF. Since this filter was observed afterwards to have 3 dB polarization dependent loss (PDL), selected OSNR measurements were verified after replacing with a low PDL filter. Another low-PDL 1.2-nm BPF was used after the noise loading, and an optical modulation analyzer (OMA: Agilent Technologies N4391A, 13 GHz, 40 GSa/s) was used for constellation analysis and BER measurements. The pilot-tone path was amplified and filtered with a 0.3 nm OBPF. For both signal and pilot-tone paths, VOAs and optical taps were used to control and monitor optical power at the OMA input with both maintained at 5 dBm at the receiver for all measurements. Chromatic dispersion compensation and polarization tracking were performed in the OMA for all measurements and the impact of the phase tracking (PT) algorithm was quantified by BER measurements for intradyne (ID) and self-homodyne (SH) detection. ID measurements were performed with the OMA's internal laser with a linewidth of approximately 100 kHz and compared to SH detection when transmitting the pilot-tone across 3 different SDM channels, with the SDM and WDM penalties measured in each case.

Results

Figure 5:
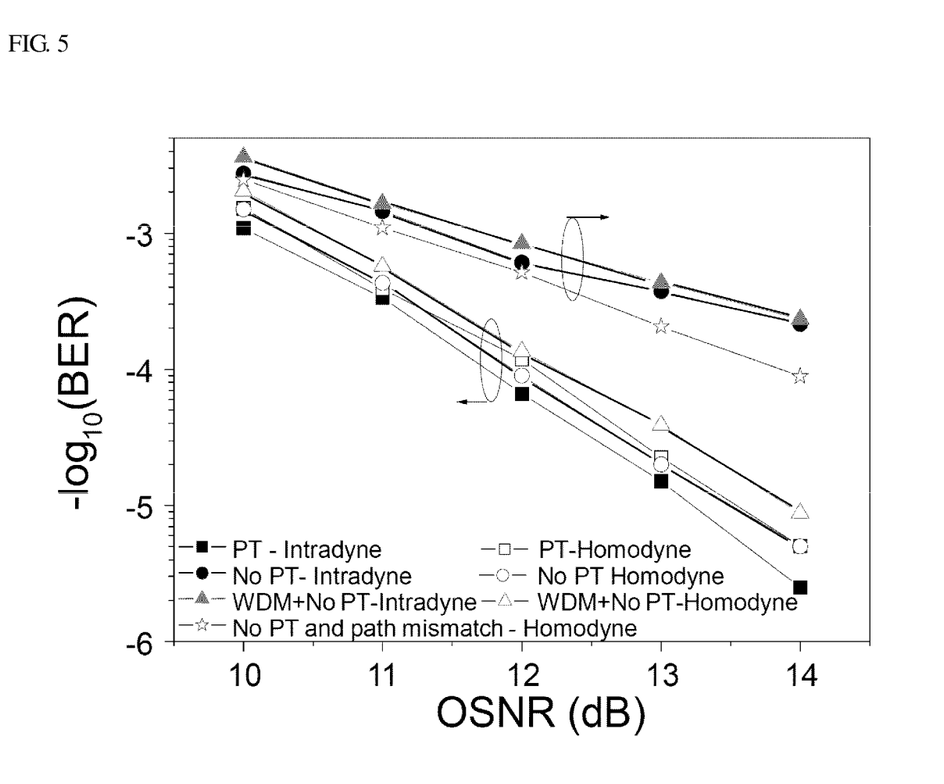
FIG. 5 is a graph as a substitute for a diagram, illustrating a relationship between a BER (bit error rate) and an OSNR of a measurement signal in WDM.

Initially, the phase noise cancellation was verified with single wavelength and WDM signals transmitted only on an outer core measurement channel of the multi-core fiber and the pilot tone on the center core without signal light in the dummy SDM channels. FIG. 5 shows BER comparison of ID and SH coherent detection for measurements with and without the receiver PT algorithm employed for the single and WDM channel case. Additionally, to verify the benefit of the phase noise cancellation for SH transmission, an additional BER curve was measured for the SH case without phase tracking with the path length between pilot-tone and signal paths intentionally misaligned by removing approximately 70 m of path length compensation fiber and adjusting the fiber launch power appropriately.

FIG. 5 is a graph as a substitute of a diagram, illustrating a relationship between the BER and the OSNR of the measurement signal in the WDM. In FIG. 5, the upper ellipse indicates a group of the ID detection where the phase tracking is not performed and the SH detection where the difference is formed. On the other hand, in FIG. 5, the lower ellipse indicates a group of the ID detection where the phase tracking is performed and the SH detection where the phase tracking is not performed.

FIG. 5 shows that the best results are achieved with the receiver PT algorithm employed and using ID detection.

However, there is a penalty of almost 2 dB at BER=$10^{-3}$ when ID detection is used without the PT algorithm. With SH detection employed, phase noise cancellation means that it is possible to achieve almost the same performance without the requirement of potentially costly PT algorithm implemented in DSP. The presence of phase noise cancellation can be inferred by the additional penalty (1 dB at BER=$10^{-3}$) for the case of SH detection after path length misalignment. Additionally, FIG. 5 shows that for the ID case, there is a small penalty for WDM transmission compared to single channel which is attributed to additional noise from reduced EDFA input power on both the pilot-tone and signal channel. Since the total launch power into each core was maintained at 0dBm for both measurements, WDM transmission causes 12 dB lower power per channel. For the SH case, the penalty is slightly larger (0.5 dB at BER=$10^{-3}$) since the pilot-tone power per channel into the fiber is also reduced.

Figure 6:
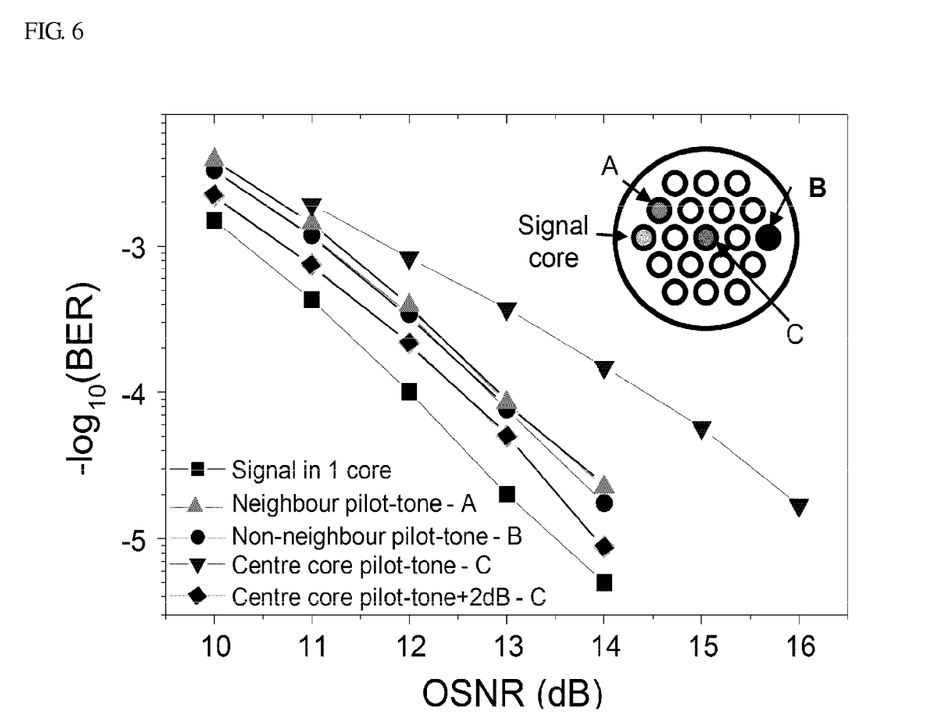
FIG. 6 is a graph as a substitute for a diagram, illustrating measurement values of SDM penalties during propagating of a pilot tone in various cores.

Next, the impact of inter-core crosstalk on the performance of the SH system was investigated. This was done by comparing measurements with and without light in the dummy SDM channels and changing the core used for pilot-tone transmission, since crosstalk was previously observed to vary between cores, with center and inner cores experiencing the most severe crosstalk. Hence, for the same outer core signal channel, 3 pilot-tone positions were investigated. These were a neighboring outer core, non-neighboring outer core and center core, shown as A, B and C respectively in FIG. 6 inset. FIG. 6 shows a summary of results for all 3 cases with the PT algorithm disabled in all cases.

FIG. 6 shows that the choice of core for pilot-tone transmission has an impact on system performance. Compared to the single core case, use of the center core caused the largest penalty of almost 2 dB at BER=$10^{-3}$. This penalty was not observed for the same case with ID detection showing that interference with the pilot tone is the origin of the performance degradation. The penalty is reduced to less than 1 dB when using one of the outer cores for pilot-tone transmission. There was only a small penalty when the pilot tone was placed in a neighboring channel to the signal, showing that the presence of the unmodulated pilot-tone does not introduce any additional interference compared to the modulated signal channels. Also shown in FIG. 6 is the impact of increasing the pilot-tone power compared to the other SDM channels. For the center core case, the fiber launch power was increased by 2 dB relative to the signal channels which reduced the penalty for center core pilot-tone transmission to under 0.5 dB at BER=$10^{-3}$.

Since path length can be a critical issue for SH systems using higher order modulation formats and higher baud rates, the relative variation of path length was monitored throughout measurements and over temperature variations of 4° C. The largest variation of optical length between pilot-tone and signal paths observed was 0.8 cm or 40 ps over the whole transmission system. This was without any active compensation and included optical path length drift from other components. For example, after splitting from the pilot-tone, the signal path included 4 EDFAs, modulator, PCs, VOAs, OBPFs, and connecting fibers, in addition to the multi-core fiber and coupling system.

Overall, these results show that to exploit the advantages of SH detection in SDM transmission systems, it is necessary to consider and, where possible, minimize, the fiber's inter-core crosstalk to achieve the best performance. Similarly, since it is critical to successful reception of all signal channels, increasing the relative power of the pilot-tone may also be considered an option to optimize performance.

INDUSTRIAL APPLICABILITY

The present invention can be utilized in the field of an optical communication device.

REFERENCE SIGNS LIST

11 Multi-core fiber
12 Space-division multiplexing apparatus
13 Core for self-homodyne detection
14 Pilot tone guiding unit
15 Self-homodyne detection unit
16 Cores for communication
17 Signal guiding unit
21 Multiplexing unit

The invention claimed is:

1. A space-division multiplexing apparatus (12) including a multi-core fiber (11) having multiple cores, comprising:
  a multiplexing unit (21) which multiplexes a signal for communication and a pilot tone for self-homodyne detection, the signal being generated by a light source (22);
  a pilot tone guiding unit (14) which guides the pilot tone to a first core (13) for self-homodyne detection which is one of the multiple cores in the multi-core fiber (11), the first core (13) being a center core of the multiple cores;
  a signal guiding unit (17) which guides the signal for communication among the signals multiplexed by the multiplexing unit (21) to second cores (16) for communication, the second cores being around center core; and a self-homodyne detection unit (15) which detects the pilot tone output from the core (13) for self-homodyne detection and performs the self-homodyne detection,
  wherein a diameter $\phi_s$ of the first core (13) for self-homodyne detection and a diameter $\phi_c$ of the second core (16) for communication have a relationship selected from the group consisting of $1.1 \leq \phi_s/\phi_c \leq 1.3$ and $1.2 \leq \phi_s/\phi_c \leq 3$.

2. The space-division multiplexing apparatus according to claim 1, further comprising an optical comb generator for generating any one or both of the pilot tone and the signal for communication propagating through the second cores (16) for communication.

3. The space-division multiplexing apparatus according to claim 1, further comprising an optical path length adjustment unit for adjusting an optical path length difference of each core in the multi-core fiber (11) having the multiple cores.

4. A self-homodyne detection method using a space-division multiplexing apparatus (12) including a multi-core fiber (11) having multiple cores, comprising:
  guiding a pilot tone for self-homodyne detection to a first core (13) for self-homodyne detection which is any one of the multiple cores;
  guiding a data signal to a second core (16) for communication which is one of the multiple cores; and
  detecting the pilot tone output from the first core (13) for self-homodyne detection;
  detecting the data signal output from the second core (16) for communication; and performing the self-homodyne detection by demodulating the data signal for communication by using the pilot tone as a reference signal;

wherein a diameter $\phi_s$ of the first core (13) for self-homodyne detection and a diameter $\phi_c$ the second core 16 for communication have a relationship selected from the group consisting of $1.1 \leq \phi_s/\phi_c \leq 1.3$ and $1.2 \leq \phi_s/\phi_c \leq 3$.

5. The self-homodyne detection method according to claim 4, wherein the guiding a pilot tone for self-homodyne detection to a first core (13) for self-homodyne detection is guiding the pilot tone to center core of the multi-core fibre (11).

\* \* \* \* \*